United States Patent
Benkeser et al.

[15] 3,699,142
[45] Oct. 17, 1972

[54] BIS (HALOSILYL) ORGANIC COMPOUNDS AND PROCESS OF MAKING SAME

[72] Inventors: Robert A. Benkeser, W. Lafayette, Ind.; William E. Smith, Cambridge, Mass.

[73] Assignee: Purdue Research Foundation, Lafayette, Ind.

[22] Filed: March 10, 1970

[21] Appl. No.: 18,331

[52] U.S. Cl. ...260/448.2 R, 260/46.5 R, 260/46.5 P, 260/448.2 E, 260/448.2 D
[51] Int. Cl. ..............................C07f 7/04, C07f 7/12
[58] Field of Search ...260/448.2 R, 448.2 D, 448.2 F

[56] References Cited

OTHER PUBLICATIONS

"Chemical Abstracts", 50, pp. 13,728b, 1956.
"Chemical Abstracts", 50, p. 154,516i, 1956.
"Chemical Abstracts", 50, p. 11,233h, 1956.

Primary Examiner—Tobias E. Levow
Assistant Examiner—P. F. Shaver
Attorney—Paul A. Rose, Aldo John Cozzi, Reynold J. Finnegan, George A. Skoler and Eugene C. Trautlein

[57] ABSTRACT

Novel process for producing bis(halosilyl) organic compounds by reacting two moles of a trihalosilane having one silicon-bonded hydrogen atom per molecule with one mole of a carbonyl halide in the presence of a tertiary amine. A normally liquid organic nitrile solvent which does not chemically combine with the reactants or products of the process can be used.

Novel bis(halosilyl) organic compounds having the formula,

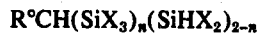

wherein $n$ is an integer of 1 to 2, $R°$ is a monovalent hydrocarbon group having at least two carbon atoms, or a monovalent group of the formula,

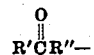

wherein $R'$ is selected from the class consisting of halogen atoms and $R'''O-$ groups wherein $R'''$ is a monovalent hydrocarbon group, and $R''$ is a divalent hydrocarbon group; a monovalent group of the formula,

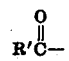

halogen atoms; and a monovalent group of the formula $R'''O-$; and X is a halogen atom. The novel compounds can be converted by hydrolysis and/or condensation into resinous siloxanes useful as, for example, potting compositions.

39 Claims, No Drawings

BIS (HALOSILYL) ORGANIC COMPOUNDS AND PROCESS OF MAKING SAME

This invention relates to a novel process for producing bis(halosilyl) organic compounds and to novel bis(halosilyl) organic compounds produced thereby. More particularly, this invention relates to the production of bis(halosilyl) organic compounds, in which two halosilyl groups are bounded to a single carbon atom of the organic moiety, by means of the reductive silylation of carboxylic acid halides, hereinafter called carbonyl halides.

It is believed that, heretofore, there has not been known any generally applicable process for producing 1,1-bis(halosilyl) organic compounds in suitably high yields. Heretofore, direct synthesis reactions of alkyl halides with silicon, hydrosilylation reactions or high temperature condensations involving an appropriate alkyl halide with trichlorosilanes have been used to produce halosilyl organic compounds in which a single halosilyl group is bonded to each organic molecule. These prior methods are not suitable for producing bis(halosilyl) organic compounds. Moreover, the direct synthesis reactions and high temperature condensations require complex, expensive equipment and are limited to the use of reactants and the production of products having great thermal stability, and the hydrosilylation is economically limited to the production of alkyl silanes and vinyl silanes and is not practical for the production of organic compounds having two halosilyl groups bonded to a single carbon atom.

The process of this invention is simple and facile to carry out and no specialized or complex expensive equipment is required. The novel process produces high yields of the desired bis(halosilyl) organic compounds which are easily recovered from the reaction mixture using conventional separation techniques, such as, extraction, precipitation, and/or distillation. In addition, the starting materials used in this process are, for the most part, relatively inexpensive and readily available.

The process of this invention involves the reaction, in the presence of a tertiary amine, of 2 moles of a trihalosilane having one hydrogen atom bonded to silicon with 1 mole of a carbonyl halide to convert the carbonyl halide group to the bis(halosilyl) methyl group. A typical reaction according to this invention may be explained by the following equation:

$RC(O)X + HSiX_3 + R_3'N + HSiX_3 \longrightarrow$
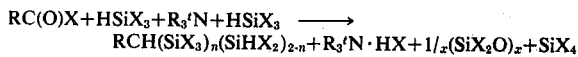
$RCH(SiX_3)_n(SiHX_2)_{2-n} + R_3'N \cdot HX + 1/x(SiX_2O)_x + SiX_4$ wherein the reactant $RC(O)X$ is the carbonyl halide, the reactant $HSiX_3$ is the trihalosilane, $R_3'N$ is the tertiary amine, $RCH(SiX_3)_n(SiHX_2)_{2-n}$ is the bis(halosilyl) organic compound product, $R_3'N \cdot HX$ is a tertiary amine hydrochloride by-product and $1/x(SiX_2O)_x$ is a dichlorosiloxy cyclic polymer believed to be obtained as a by-product in which $x$ is an integer of, for example, three or four or more. R, R', X and $n$ are as defined hereinafter. Preferably, R and R' are free of aliphatic carbon-to-carbon unsaturation.

The reaction is preferably carried out under substantially anhyrous conditions in a normally liquid solvent that does not, to any substantial extent, chemically combine with the reactants or products of the reaction. Organic nitrile solvents of this type have been found to highly effective in producing bis(chlorosilyl) organic compounds from trichlorosilane and carbonyl chlorides. Illustratively, organic nitrile solvents that can be used include acetonitrile, propionitrile, butyronitrile, valeronitrile, capronitrile, caprylonitrile, caprinitrile, lauronitrile, benzonitrile, tolunitrile and the like. Acetonitrile has been found to be highly useful as a solvent.

The trihalosilanes employed have one hydrogen atom bonded to silicon and can be depicted by the formula, $HSiX_3$, wherein X is a halogen atom, such as, chlorine, bromine or iodine. Trichlorosilane, $HSiCl_3$, is the preferred reactant.

The carbonyl halides that can be employed include the acid halides of carboxylic acids, phosgene, and haloformate esters and can be represented by the formula, $RC(O)X$, wherein R is selected from the class consisting of a monovalent hydrocarbon group; a monovalent group of the formula, $R'C(O)R''-$, wherein R' is selected from the class consisting of halogen atoms and $R'''O-$ groups wherein R''' is a monovalent hydrocarbon group, and R'' is a divalent hydrocarbon group; a monovalent group of the formula, $RC(O)-$; halogen atoms; and a monovalent group of the formula $R'''O-$; and X is a halogen atom.

Preferably, when R is monovalent hydrocarbon, it, R'' and R''' have one to 18, more preferably one to 12, carbon atoms. When R is halogen or contains a halogen bonded to a carbonyl group, such halogen is preferably chlorine. X is preferably chlorine.

Typical monovalent hydrocarbon groups as represented by R and R''' include the alkyl groups, e.g., methyl, ethyl, propyl, butyl, pentyl, hexyl, octyl, nonyl, decyl, dodecyl, tetradecyl, hexadecyl, stearyl, isopropyl, isobutyl, isoamyl, neopentyl, neohexyl, neobutyl, and the like; the cycloalkyl groups, e.g., cyclopentyl, cyclohexyl, and the like; the aryl, alkaryl and aralkyl groups, e.g., phenyl, tolyl, naphthyl, xylyl, benzyl, ethylphenyl, phenylethyl, biphenylyl and the like.

Typical divalent hydrocarbon groups represented by R'' include the alkylene groups, e.g., methylene, ethylene, 1,2-propylene, 1,4-butylene, 1,3-butylene, 1,5-pentylene, 1,6-hexylene, 1,10-do-decylene, and the like; the cycloalkylene groups, e.g., cyclohexylene, cyclopentylene and the like; and the arylene, alkarylene and aralkylene groups, e.g., phenylene, benzylidene, tolylene, xylylene, naphthylene, $-C_6H_4CH_2C_6H_4-$, 5,6-dimethyl-1,3-phenylene, 2,4-dimethyl-1,3-phenylene, anthrylene and the like.

Illustratively, carbonyl halides of the type described above include the alkanoyl halides, such as, acetyl chloride, propionyl chloride, butanoyl chloride, octanoyl chloride, decanoyl chloride, stearoyl chloride, dodecanoyl chloride, pivaloyl chloride, isobutyryl chloride, and the like; aryl-substituted alkanoyl halides, such as, benzoyl chloride, alpha-phenylacetyl chloride, diphenylacetyl chloride, triphenylacetyl chloride, beta-phenylpropionyl chloride, ortho-phenylbenzoyl chloride, ortho-, meta- and para-toluyl chloride, phenylacetyl chloride, ortho-, meta- and para-tolylacetyl chloride, and the like; alkanedioyl halides, such as, oxalyl chloride, succinoyl chloride, propane-1,3-dioyl chloride, adipyl chloride, tetramethylbutanedioyl chloride, glutaryl chloride, azelyl chloride, sebacyl chloride, suberyl chloride, and the like; halides of alkanedioic acid half esters, such as the acid chlorides of each of the methyl, ethyl, dodecyl, stearyl, phenyl and benzyl half esters of each of oxalic acid, succinic acid, adipic acid, azelic acid, sebacic acid, and suberic acid, and the like; phosgene; and haloformate esters, such as, methyl, ethyl, butyl, hexyl, decyl, dodecyl, stearyl, phenyl and benzyl chloroformates, and the like.

The tertiary amine, $R_3'N$, employed in the process of this invention preferably is a trialkylamine, such as, tri-n-propylamine, tri-n-hexylamine, triethylamine, tributylamine, trinonylamine and the like. Any tertiary amine that does not, to any substantial extent, chemically combine with the carbonyl chloride or the reaction products but combines with the hydrogen halide released during the reaction to form the tertiary amine hydrohalide may be used, such as, pyridine, picoline, collidine, quinoline and the like. It is convenient to select a tertiary amine which is soluble in the media in which the reaction takes place and the hydrochloride of which is insoluble in such media or precipitates when an extracting solvent, such as ether, is added during recovery operations after completion of the reaction.

In general, the reaction illustrated by the above equation can be conducted by mixing the trihalosilane, carbonyl halide, and tertiary amine, preferably in a solvent such as acetonitrile, and maintaining the mixture at an elevated temperature, e.g., about 40° C. to about 200°C., preferably about 50°C. to about 100°C. The reaction temperature is not narrowly critical and can be varied widely. The reaction is conveniently carried out by refluxing the mixture until the desired bis(halosilane) is formed. Refluxing can be conveniently conducted at atmospheric pressure, although higher or lower pressures can be employed. The reaction time also is not narrowly critical and can be varied over broad ranges. For example, times of as little as about one-half hour or less up to about 24 hours or more may be used. If desired, the reaction mixture can be stirred at room temperature (e.g., 25 to 30°C.) for a period of time ranging from one-half hour or less to 2 hours or more before refluxing or otherwise raising the temperature to an elevated level.

The relative amounts of carbonyl halide, trihalosilane and tertiary amine mixed to form the reaction mixture are not narrowly critical. Preferably, stoichiometric amounts up to a large excess of trihalosilane and tertiary amine can be employed. Thus, for each mole of carbonyl halide, preferably at least about 3 moles of trihalosilane are used in forming the reaction mixture. Although only 2 moles of trihalosilane chemically combine with one mole of the carbonyl halide, an additional mole of trihalosilane is believed to be consumed in the reaction as shown in the above equation. Greater amounts of trihalosilane, for example, up to 8 or 10 moles, per mole of carbonyl halide can be used to form the reaction mixture, although about 3 to about 6 moles per mole of carbonyl halide are preferred. Lower amounts of trihalosilane may be employed although lower yields and longer reaction time may result.

The number of moles of tertiary amine per mole of carbonyl halide also is not narrowly critical and can range from about 2 to about 8, preferably about 2 to about 4, moles of tertiary amine per mole of carbonyl halide.

The order in which the reactants are mixed is not narrowly critical, although it is usually preferred, because of the exothermic nature of the reaction, to control the reaction by the slow addition of the tertiary amine to a mixture of the trichlorosilane and carbonyl halide. It is also usually desirable to chill the reaction mixture during such addition as an aid to controlling the exothermic reaction. For this purpose, also, it is usually preferred to conduct the reaction in a suitable solvent as explained above. The amount of solvent is not narrowly critical and can vary over a wide range. Too small amounts of solvent could, of course, be of little effect in controlling the reaction and too much could, of course, render the reaction too sluggish. It is convenient to employ the solvent in amounts ranging from about 10 parts to about 500 parts, preferably about 50 parts to about 100 parts, by weight of solvent per 100 weight parts of trihalosilane, carbonyl halide and tertiary amine in the reaction mixture.

The product bis(halosilyl) organic compound can be recovered by any convenient means, such as by fractional distillation under reduced pressure or, especially if the product has a high boiling point, by rotary evaporation under reduced pressure. It is preferable to remove the tertiary amine hydrochloride by-product prior to recovering the bis(halosilyl) product and this can be conveniently accomplished by adding a precipitant for the tertiary amine hydrochloride, such as ether or pentane, which dissolves the bis(halosilyl) product and the remaining by-products.

The novel bis(halosilyl) organic compounds of this invention can be represented by the formula:

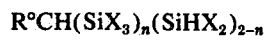

wherein $n$ is an integer of 1 to 2, $R°$ is a monovalent hydrocarbon group having at least two carbon atoms, a monovalent group of the formula,

wherein $R'$ is selected from the class consisting of halogen atoms and $R'''O—$ groups wherein $R'''$ is a monovalent hydrocarbon group, and $R''$ is a divalent hydrocarbon group; a monovalent group of the formula,

halogen atoms; and a monovalent group of the formula $R'''O—$; and X is a halogen atom. Typical monovalent hydrocarbon groups represented by $R°$ and $R'''$ are as previously illustrated and typical divalent hydrocarbon groups represented by $R''$ are as previously illustrated.

The bis(halosilyl) organic compounds of this invention are useful in a wide variety of applications. By hydrolysis and condensation in accordance with well known techniques of hydrolyzing and condensing known halosilyl organic compounds, the bis(halosilyl) organic compounds disclosed herein form resinous siloxanes that are useful, for example, as protective coatings, molding compositions and potting compositions for electronic components. The bis(halosilyl) organic compounds disclosed herein can be cohydrolyzed and concondensed with other halosilyl organic compounds to vary the properties desired in the resulting resinous siloxane to suit particular requirements for protective coatings and potting compositions made from such siloxanes. Also, the bis(halosilyl) organic compounds can be further reduced with potassium hydroxide and ethanol to cleave the halosilyl groups and replace them with hydrogen thus forming the corresponding organic compound, for example, in a manner which might be explained by the equation:

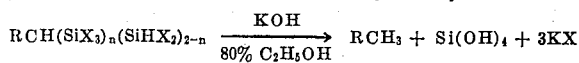

The corresponding organic compounds are well known and have applications that are well known to those skilled in the art.

The following examples are presented in which, unless otherwise specified, all parts and percentages are on a weight basis, all temperatures are on the Centigrade scale, and the designation "mmol" means millimoles.

EXAMPLE 1

Preparation of 1,1-bis(trichlorosilyl) ethane from acetyl chloride

A dry 500 ml three-necked flask equipped with reflux condenser, addition funnel, pot thermometer, and magnetic stirring bar was charged with 15.7 g acetyl chloride (200 mmol), 109 g trichlorosilane (800 mmol), and 100 ml anhydrous acetonitrile. The solution was stirred under nitrogen while 68.8 tri-n-propylamine (480 mmol) was added over a 2 hour period. The temperature was kept below 15° by means of an ice bath. The resultant yellow solution was stirred at 25–30° for 1 hour, then heated at reflux (62–66°) for another hour. It was then cooled and combined with 500 ml anhydrous ether, causing precipitation of white solid. The crystals were filtered off under anhydrous conditions, washed with ether, and dried in vacuo. Isolated was 63.6 g (89 percent yield) tri-n-propylamine hydrochloride, mp 139–141°.

The filtrate was distilled through a 150 mm Vigreux column. After removal of the solvents and lower-boiling components, a colorless liquid was collected (26.0 g, boiling at 60–63° (4 mm Hg reduced pressure) and 6.8 g of the same material at 70–72° (7 mm Hg reduced pressure)). This distillate product was identified as 1,1-bis(trichlorosilyl)ethane, $CH_3CH(SiCl_3)_2$, (55 percent yield). The infra red spectra and nuclear magnetic resonance spectra of this product were consistent with its identity as 1,1-bis(trichlorosilyl)ethane. The product had a boiling point (micro) of 201° and an elemental analysis of: Calcd. for $C_2H_4Cl_6Si_2$: C, 8.09; H, 1.36; Cl, 71.64; Si, 18.92. Found: C, 8.34; H, 1.62; Cl, 71.36; Si, 18.64.

The distillation also yielded 2.9 g of yellow oil boiling at 80–152° (7 mm Hg reduced pressure) and the residue was 24 g amorphous solid with Si-Cl hydrolytic activity.

The reaction may be depicted by the following equation:

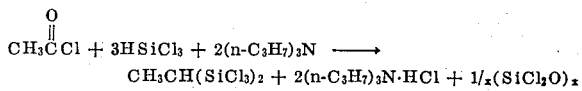

EXAMPLES 2 THROUGH 5

The process of Example 1 was carried out four more times using, in place of acetyl chloride on a mole for mole basis, respectively, propanoyl chloride, $C_2H_5COCl$ (Example 2), isobutanoyl chloride, $(CH_3)_2CHCOCl$ (Example 3), neopentanoyl chloride, $(CH_3)_3CCOCl$ (Example 4), and hexanoyl chloride, n-$C_5H_{11}COCl$ (Example 5). In each case, the molar ratio of carbonyl chloride to trichlorosilane to tri-n-propylamine was 1:4:2.4. In each case, tri-n-propylamine hydrochloride was isolated by filtration in substantially quantitative yield. The products listed in Table I below were separated by distillation at the temperatures and pressures correspondingly listed. The yields of each product are also listed. In each case the product identity was verified by elemental analysis, infra red spectra and nuclear magnetic resonance spectra. In each case the dichlorosiloxane cyclic polymer,$(SiCl_2O)_x$, remained as a residue after distillation.

TABLE 1

| Ex. | Product | Boiling Conditions °C. | mmHg | Yield, % |
|---|---|---|---|---|
| 2 | 1,1-Bis(trichlorosilyl) propane $CH_3CH_2CH(SiCl_3)_2$ | 70–92 | 8.5 | 57 |
| 3 | 1,1-Bis(trichlorosilyl) isobutane $(CH_3)_2CHCH(SiCl_3)_2$ | 80–82 | 3.0 | 41 |
| 4 | 1,1-Bis(trichlorosilyl) neopentane $(CH_3)_3CCH(SiCl_3)_2$ and 1-dichlorohydrogensilyl-1-trichlorosilylneopentane $(CH_3)_3CCH(SiHCl_2)(SiCl_3)$ | 72–84 <br> 2–3 <br> 72–84 | 2–3 <br> 2–3 | 19 <br> 43 |
| 5 | 1,1-Bis(trichlorosilyl)-n-hexane n-$C_5H_{11}CH(SiCl_3)_2$ | 100 | 3 | 72 |

The 1,1-bis(trichlorosilyl)neopentane obtained in Example 4 was converted to 1dichlorohydrogensilyl-1-trichlorosilylneopentane by mixing it with a molar excess of trichlorosilane (e.g., four moles of trichlorosilane per mole of 1,1-bis(trichlorosilyl)neopentane) in acetonitrile solvent (2.4 moles per mole of 1,1-bis(trichlorosilyl)neopentane) and in the presence of tri-n-propylamine (or tri-n-propylamine hydrochloride), holding the resulting solution at room temperature (25 to 30°C.) for one hour and then refluxing for an additional hour.

EXAMPLE 6

The process of Example 1 was carried out using benzoyl chloride, $C_6H_5COCl$, in place of acetyl chloride, and methyldihexylamine in place of tri-n-propylamine, in amounts providing a molar ratio of benzoyl chloride to trichlorosilane to methyldihexylamine of 1:5:2. Also, instead of stirring at about 25 to 30°C. for one hour and refluxing for one hour, the solution of benzoyl chloride, trichlorosilane and methyldihexylamine in acetonitrile was refluxed for 18 hours. Methyldihexylamine hydrochloride was isolated by filtration in substantially quantitative yield. The filtrate was distilled and after removal of solvent and low boiling materials, there was obtained the product alpha,alpha-bis(trichlorosilyl)-toluene, $C_6H_5CH(SiCl_3)_2$, boiling at 122°–126°C (3–4 mm Hg reduced pressure) at a yield of 46 percent and the product alpha-trichlorosilyltoluene, $C_6H_5CH_2SiCl_3$, boiling at 82°–84° C. (8 mm Hg reduced pressure) at a yield of 9%. The identities of these products were verified by elemental analysis, infra red spectra and nuclear magnetic resonance spectra.

The dichlorosiloxane cyclic polymer, $(SiCl_2O)_x$, remained as a residue after distillation.

What is claimed is:

1. A process for producing bis(halosilyl) organic compounds comprising: (I) forming a reaction mixture containing (a) a tertiary amine, (b) a trihalosilane having the formula:

$$HSiX_3$$

wherein X is halogen, and (c) a carbonyl halide having the formula:

$$R\overset{O}{\underset{\|}{C}}X$$

wherein X is a halogen atom and R is selected from the class consisting of:
i. a monovalent hydrocarbon group;
ii. a monovalent group of the formula:

$$R'\overset{O}{\underset{\|}{C}}R''-$$

wherein R' is selected from the class consisting of halogen atoms and R'''O— groups (where R''' is a monovalent hydrocarbon group), and R'' is a divalent hydrocarbon group;
iii. a monovalent group of the formula:

$$R'\overset{O}{\underset{\|}{C}}-$$

where R' is as defined above;
iv. a halogen atom; and
v. a monovalent group of the formula R'''O— (where R''' is a defined above), said reaction mixture containing at least 3 moles of (b) per mole of (c); and (II) reacting (b) and (c) in the presence of (a) to produce a bis(halosilyl) organic compound by replacing the carbon to oxygen bonds of a carbonyl group $$\left(\overset{O}{\underset{\|}{C}}\right)$$

of the carbonyl halide by two carbon to trihalosilyl (—$SiX_3$ wherein X is halogen) bonds.

2. Process as claimed in claim 1 for producing bis(chlorosilyl) organic compounds wherein said trihalosilane is trichlorosilane, R is an alkyl group and X is a chlorine atom.

3. Process as claimed in claim 1 for producing bis(chlorosilyl) organic compounds wherein said trihalosilane is trichlorosilane, R is an aryl group and X is a chlorine atom.

4. Process as claimed in claim 1 wherein X is a chlorine atom and said reaction is carried out in a normally liquid organic nitrile solvent which does not chemically combine with the reactants or products of said process.

5. Process as claimed in claim 4 wherein said solvent is an alkane nitrile.

6. Process as claimed in claim 4 wherein said tertiary amine is a trialkylamine.

7. Process as claimed in claim 4 for producing bis(chlorosilyl)alkane wherein said carbonyl halide is an alkanoyl halide.

8. Process as claimed in claim 4 for producing an aryl-substituted bis(chlorosilyl)alkane wherein said carbonyl halide is an aryl-substituted alkanoyl halide.

9. Process as claimed in claim 7 for producing 1,1-bis(trichlorosilyl)ethane wherein said carbonyl halide is acetyl chloride.

10. Process as claimed in claim 7 for producing 1,1-bis(trichlorosilyl)propane wherein said carbonyl halide is propanoyl chloride.

11. Process as claimed in claim 7 for producing 1,1-bis(trichlorosilyl)isobutane wherein said carbonyl halide is isobutanoyl chloride.

12. Process as claimed in claim 7 for producing 1,1-bis(trichlorosilyl)hexane wherein said carbonyl halide is hexanoyl chloride.

13. Process as claimed in claim 7 for producing 1-dichlorohydrogensilyl-1-trichlorosilylneopentane and 1,1-bis(trichlorosilyl)neopentane wherein said carbonyl halide is neopentanoyl chloride.

14. Process as claimed in claim 8 for producing alpha,alpha-bis(trichlorosilyl)toluene wherein said carbonyl halide is benzoyl chloride.

15. Process as claimed in claim 4 wherein said trichlorosilane, said carbonyl halide and said tertiary amine are mixed in a ratio of at least 2 moles of said trichlorosilane and at least 2 moles of said tertiary amine per mole of said carbonyl halide and the reaction is carried out at elevated temperature.

16. Bis(halosilyl) organic compound having the formula:

$$R°CH(SiX_3)_n(SiHX_2)_{2-n}$$

wherein n is an integer of 1 to 2, R° is a monovalent hydrocarbon group having at least two carbon atoms, a monovalent group of the formula, $$R'\overset{O}{\underset{\|}{C}}R''-$$

wherein R' is selected from the class consisting of halogen atoms and R'''O— groups wherein R'''' is a monovalent hydrocarbon group, and R'' is a divalent hydrocarbon group; a monovalent group of the formula, $$R'\overset{O}{\underset{\|}{C}}-$$

halogen atoms; and a monovalent group of the formula R'''O—; and X is a halogen atom.

17. Bis(halosilyl) organic compound as claimed in claim 16 wherein X is chlorine and R° is selected from the class consisting of alkyl groups having two to 18 carbon atoms and aryl groups having six to 18 carbon atoms.

18. Bis(halosilyl) compound as claimed in claim 17 having the formula:

$$CH_3CH_2CH(SiCl_3)_2.$$

19. Bis(halosilyl) compound as claimed in claim 17 having the formula:

$$(CH_3)_2CHCH(SiCl_3)_2.$$

20. Bis(halosilyl)compound as claimed in claim 17 having the formula:

$$(CH_3)_3CCH(SiHCl_2)(SiCl_3).$$

21. Bis(halosilyl) compound as claimed in claim 17 having the formula:

$$(CH_3)_3CCH(SiCl_3)_2.$$

22. Bis(halosilyl) compound as claimed in claim 17 having the formula:

$$CH_3(CH_2)_4CH(SiCl_3)_2.$$

23. Bis(halosilyl) compound as claimed in claim 17 having the formula:

$$C_6H_5CH(SiCl_3)_2.$$

24. A process as claimed in claim 1 wherein R is as defined in part (i) of said claim.
25. A process as claimed in claim 1 wherein R is as defined in part (ii) of said claim.
26. A process as claimed in claim 1 wherein R is as defined in part (iii) of said claim.
27. A process as claimed in claim 1 wherein R is as defined in part (iv) of said claim.
28. A process as claimed in claim 1 wherein R is as defined in part (v) of said claim.
29. A process as claimed in claim 1 wherein the reaction mixture contains at least four moles of the trihalosilane per mole of the carbonyl halide and from 2 to 8 moles of the tertiary amine per mole of the carbonyl halide.
30. A bis(halosilyl) organic compound having the formula:

$$R°CH(SiX_3)_n(SiHX_2)_{2-n}$$

wherein $n$ is 1 or 2, X is a halogen atom, and R° is: (i) an aryl, alkaryl or aralkyl group, (ii) a monovalent group of the formula $$\underset{\text{O}}{\overset{\parallel}{R'CR''}}-$$

wherein R' is selected from the class consisting of halogen atoms and R'''O— groups (where R''' is a monovalent hydrocarbon group), and R'' is a divalent hydrocarbon group; (iii) a monovalent group of the formula, $$\underset{\text{O}}{\overset{\parallel}{R'C}}-$$

where R' is as defined above; (iv) a halogen atom; or (v) a monovalent group of the formula R'''O— where R''' is as defined above.

31. A compound as claimed in claim 30 wherein R° is as defined in part (i) of said claim.
32. A compound as claimed in claim 30 wherein R° is as defined in part (ii) of said claim.
33. A compound as claimed in claim 30 wherein R° is as defined in part (iii) of said claim.
34. A compound as claimed in claim 30 wherein R° is as defined in part (iv) of said claim.
35. A compound as claimed in claim 16 wherein R° contains from three to 18 carbon atoms.
36. A compound as claimed in claim 16 wherein R° contains from four to 18 carbon atoms.
37. A compound as claimed in claim 16 wherein R° contains from five to 18 carbon atoms.
38. Bis(halosilyl) organic compound having the formula:

$$R°CH(SiX_3)_n(SiHX_2)_{2-n}$$

wherein n is an integer of 1 to 2, R° is a monovalent hydrocarbon group having at least three carbon atoms, a monovalent group of the formula $$\underset{\text{O}}{\overset{\parallel}{R'CR''}}-$$

wherein R' is selected from the class consisting of halogen atoms and R'''O— groups wherein R''' is a monovalent hydrocarbon group, and R'' is a divalent hydrocarbon group; a monovalent group of the formula, $$\underset{\text{O}}{\overset{\parallel}{R'C}}-$$

halogen atoms; and a monovalent group of the formula R'''O—; and X is a halogen atom.

39. A compound as claimed in claim 38 wherein R° is a monovalent hydrocarbon group having at least three carbon atoms.

* * * * *